United States Patent [19]

Crawford

[11] Patent Number: 4,674,946
[45] Date of Patent: Jun. 23, 1987

[54] APPARATUS FOR CHANGING JAWS ON MANIPULATORS

[75] Inventor: Gordon Crawford, Warrington, England

[73] Assignee: British Nuclear Fuels plc, Warrington, England

[21] Appl. No.: 742,847

[22] Filed: Jun. 10, 1985

[30] Foreign Application Priority Data

Jun. 21, 1984 [GB] United Kingdom ............... 8415914

[51] Int. Cl.[4] ............................................. B25J 15/04
[52] U.S. Cl. ...................................... 414/729; 901/31; 901/50
[58] Field of Search ................... 901/30, 31, 6, 7, 27, 901/29, 40, 41, 44, 45, 50; 414/730, 744 A, 744 B, 744 C, 749, 750, 751, 752, 753

[56] References Cited

U.S. PATENT DOCUMENTS

| | | | |
|---|---|---|---|
| 4,260,319 | 4/1981 | Motoda et al. | 901/16 X |
| 4,281,447 | 8/1981 | Miller et al. | 901/30 X |
| 4,488,241 | 12/1984 | Hutchins et al. | 901/30 X |
| 4,525,918 | 7/1985 | Puritz | 901/50 X |

Primary Examiner—Terrance L. Siemens
Attorney, Agent, or Firm—William R. Hinds

[57] ABSTRACT

An apparatus for changing jaw assemblies 1 on manipulators comprises a support frame having a carriage 24 movable between location blocks 30, 31 for the jaw assemblies. The carriage has an opening 29 to permit passage therethrough of a jaw assembly 1 and to receive a displaceable collar on the arm which encloses a releasable coupling between the jaw assembly and the end of the arm. The coupling is engaged or disengaged upon movement of the carriage on rods 25 relative to the location blocks and on the application of a force on the manipulator arm towards the assembly 1. The coupling may be a T-section slidable in a channel member biassed by a spring into the collar which is slidable on the arm 2.

9 Claims, 5 Drawing Figures

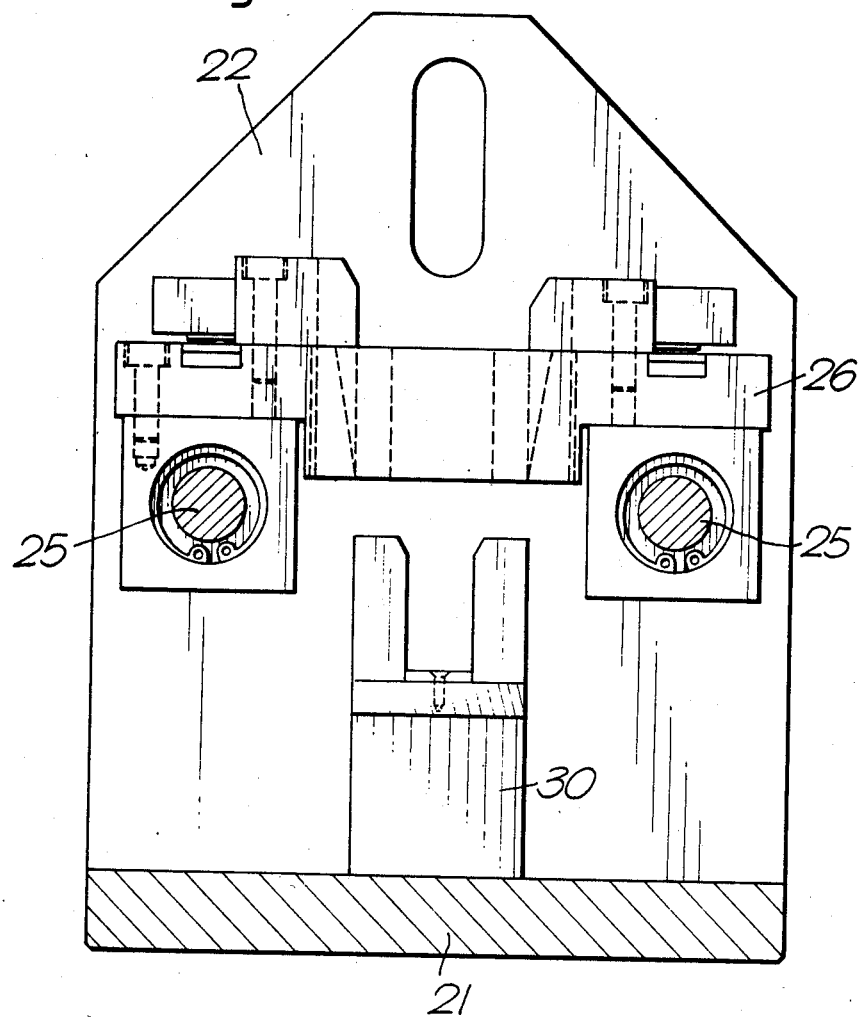

APPARATUS FOR CHANGING JAWS ON MANIPULATORS

The present invention concerns apparatus for changing jaws on manipulators used for the remote handling of dangerous objects.

In the nuclear industry it is necessary to handle hazardous radioactive or contaminated objects. This can be done by means of manipulators which extend through a wall of shielding material enclosing a cave housing the objects. The manipulators are controlled by operators from outside the cave and have jaw assemblies at their ends within the cave.

With use, the jaw assemblies can be damaged or malfunction necessitating their removal and replacement. The present invention provides an apparatus for the in-cave removal and replacement of jaw assemblies.

According to the present invention an apparatus for changing jaw assemblies on manipulators comprises a support frame having a carriage movable between at least first and second positions, location blocks for jaw assemblies mounted on the frame at the first and second positions, the carriage having an opening to permit passage of a jaw assembly therethrough and to receive a displaceable member at an end of a manipulator arm enclosing a releasable coupling between the jaw assembly and the end of the arm, the coupling being engaged or disengaged upon movement of the carriage relative to the location blocks and the application of a force on the manipulator arm towards the jaw assembly.

The releasable coupling may comprise a first part connected to the jaw assembly and a second part relatively movable in the displaceable member.

The first coupling part may comprise a T-section element and the second coupling part comprise a channel member, the stem of the T-section element being slidable in a slot in the channel member.

The channel member may be closed at one end.

The displaceable member may comprise a collar slidable on the end of the manipulator arm.

Each location block may have a cruciform groove in its surface facing the carriage.

The cruciform groove may comprise a first groove and a second groove transverse to the first groove and narrower than the first groove.

There may be detent means for releasably holding the carriage in the first and second positions.

The detent means may comprise ball detents cooperable with recesses in the carriage and releasable by force exerted by the manipulator arm.

The invention will be described, by way of example, with reference to the accompanying drawings: in which:

FIG. 5 is a section on A—A in FIG. 3.

Figure 1:
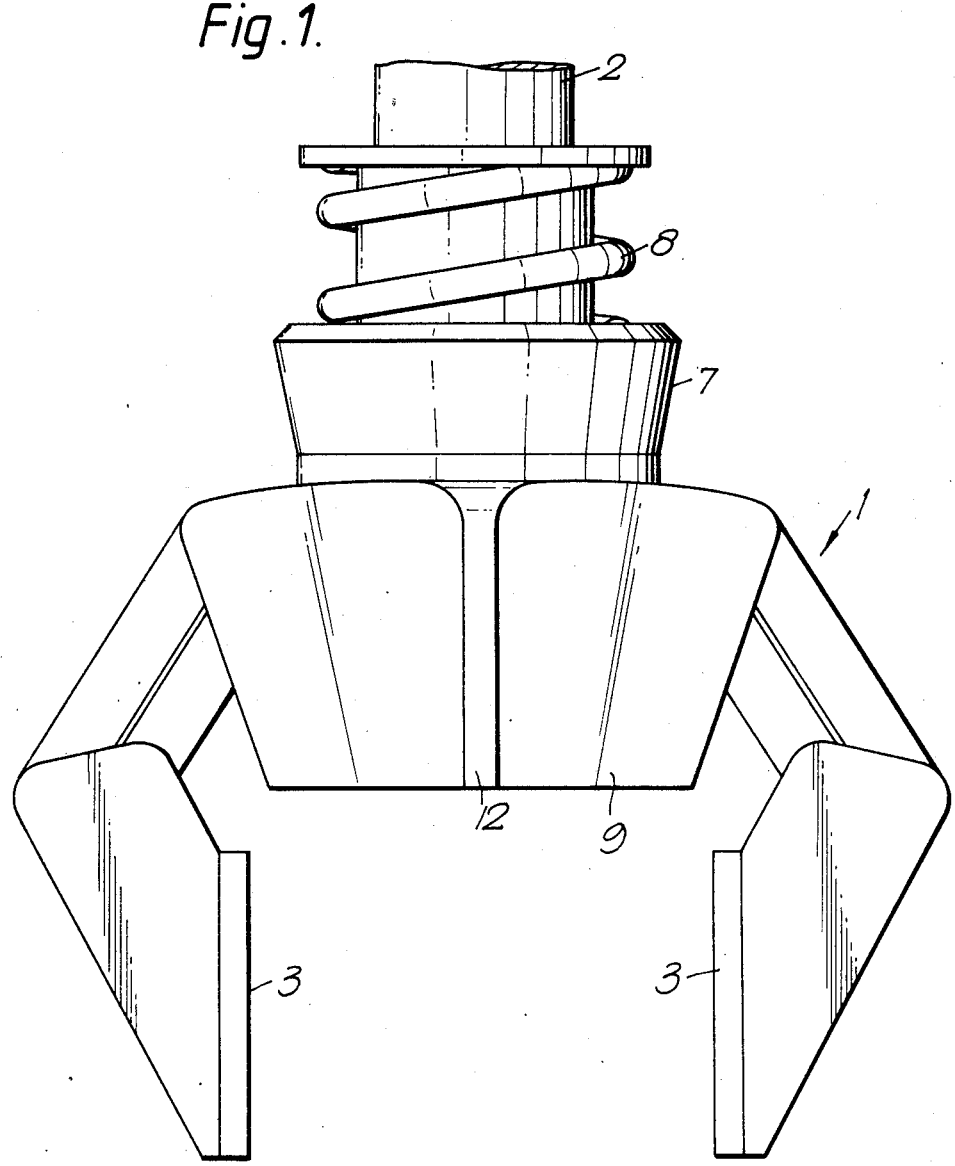
FIG. 1 is a view of a jaw assembly mounted at an end of a manipulator arm.

FIG. 1 shows a jaw assembly 1 at the end of a manipulator arm 2. The assembly 1 comprises jaws 3 which can be moved together to grasp an object therebetween, the movement being controlled from actuating means at the remote opposite end of the arm 2. In the case of a manipulator for handling radioactive objects, the manipulator arm will pass through a wall of shielding material to terminate in a hand control for an operator.

Figure 2:
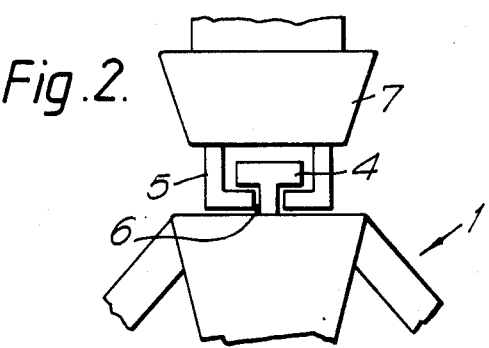
FIG. 2 is a diagrammatic illustraton of a releasable coupling between the jaw assembly and the arm.

As shown diagrammatically in FIG. 2, the jaw assembly 1 can be attached to the end of the manipulator arm by means of a T-section block 4 on the jaw assembly which cooperates with a channel-shaped member 5 at the end of the arm 2. The channel-shaped member 5 can be closed at one end, open at its opposite end and has a slot 6 in its base to receive the stem of the T-section block 4. The arrangement constitutes a releasable coupling effective by relative movement between the block 4 and the member 5 to move the block 4 through the open end of the member 5.

The member 5 is normally positioned within a collar 7 slidable on the end of the arm 2 and urged against the jaw assembly by a coil spring 8. The collar 7 is frustoconical having a tapered profile.

The jaw assembly comprises a body having spaced-apart side plates 9 between which the jaws are pivotally mounted and each plate 9 has a positioning rib 12 projecting outwardly therefrom.

Figure 3:
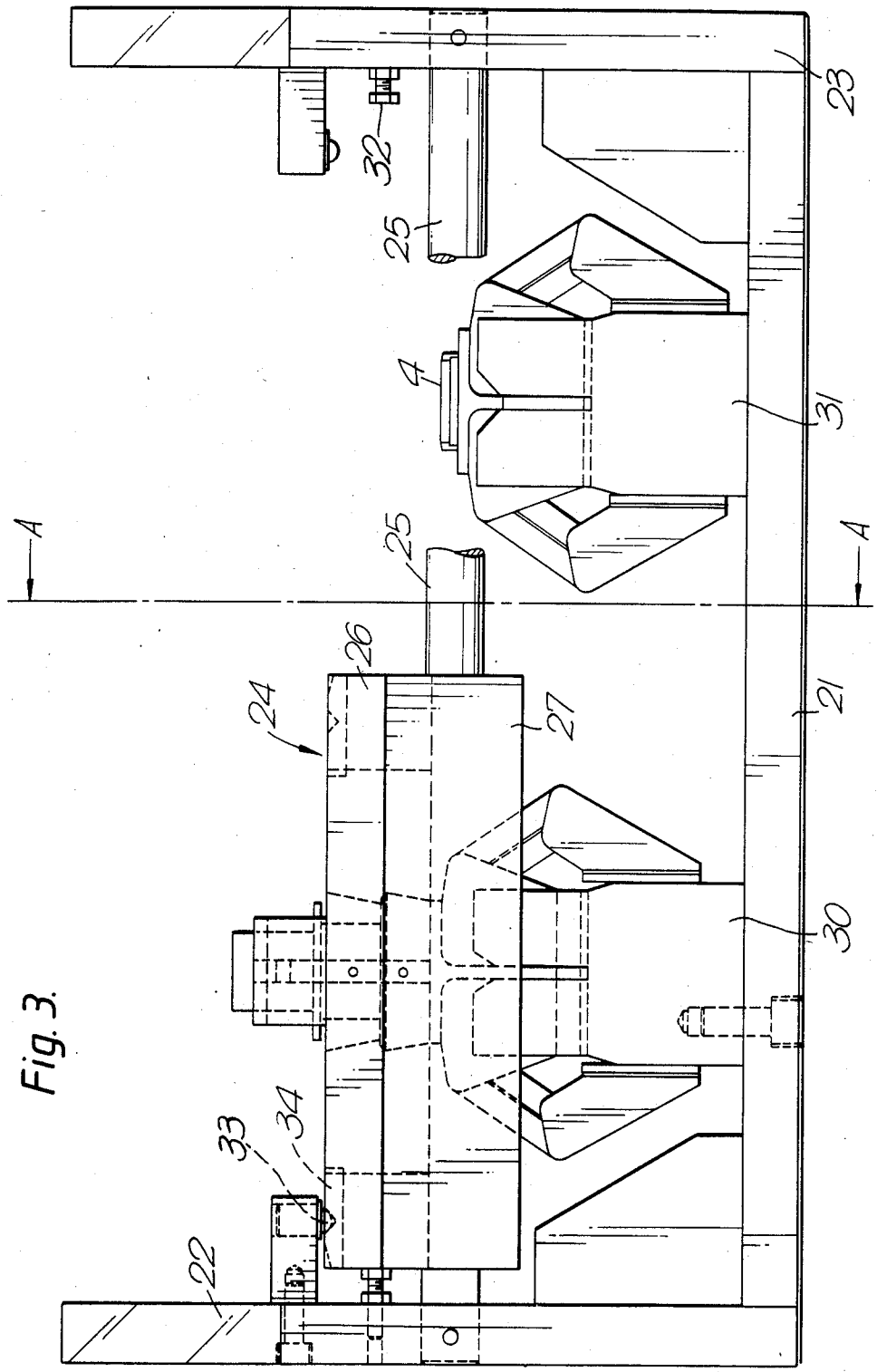
FIG. 3 is a side view of a jaw change apparatus.
Figure 4:
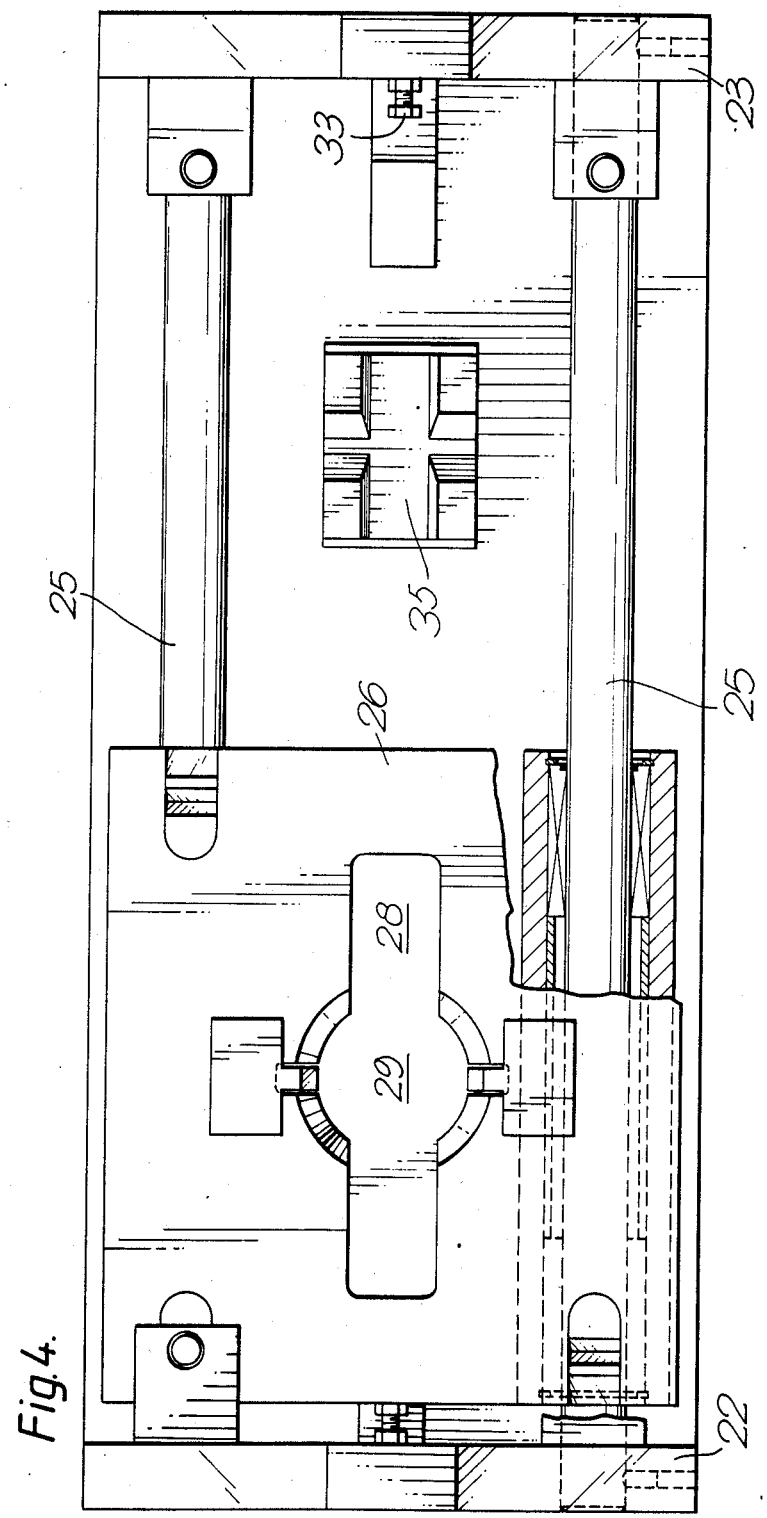
FIG. 4 is a plan view of the jaw change apparatus.

With reference to FIGS. 3, 4 and 5, a jaw change apparatus comprises a frame having a base 21 and two end walls 22, 23. A carriage 24 is slidably mounted on a pair of parallel shafts 25 extending between the end walls 22, 23. The carriage 24 comprises a platform 26 which is fixedly secured to bearing housings 27 slidable on the shafts 25.

The carriage platform 26 is formed with an opening therethrough in the form of a rectangular slot 28 having an enlarged substantially circular central region 29, the shape of the opening being such as to receive the jaw assembly and the end of the manipulator arm. The surface of the carriage about the opening can be bevelled to assist in the introduction of the jaw assembly and end of the manipulator arm into the opening.

The enlarged central region of the opening in the platform is tapered to cooperate with the taper on the collar 7 at the end of the arm. The jaw assembly and the arm are lowered into the opening in the platform 26 such that the collar rests within the tapered central region. In this position the jaw assembly extends below and is exposed beneath the platform 26.

The base 21 of the frame supports two location blocks 30, 31 the blocks 30, 31 being positioned to lie immediately beneath the opening in the platform 26 when the carriage 24 is in end positions. At the end positions the carriage abuts against stops 32 on the end walls 22, 23 and is releasably retained in position by ball detents 33 which cooperate with notched inserts 34 in the surface of the platform.

Each location block 30, 31 has a cruciform opening 35 to receive the jaw assembly 1. The spaced apart side plates 9 of the assembly 1 are received in the wide groove or slot of the opening 35 extending lengthwise of the frame and the ribs 12 are received in the narrower transverse groove or slot of the opening. The width of the transverse slot to receive the ribs 12 can be different at opposite sides of the wide slot of the opening and the ribs 12 can have matching different thicknesses whereby the jaw assembly can only assume one attitude in the location blocks.

In FIGS. 3 and 4 the carriage is shown positioned in an end position above the location block 30. The jaw assembly 1 attached to the end of the manipulator arm is positioned in the location block 30 and is supported from the carriage by the wedging action of the tapered collar 7 in the tapered central region of the opening in the carriage platform 26. As shown, the side plates 9 and ribs 12 of the jaw assembly do not extend to the floor 35c of the cruciform opening 35 in the block 30. In FIG. 3, the location block 31 supports a replacement jaw assembly with the side plates 9 resting on the floor of the cruciform opening 35.

To release the jaw assembly 1 from the manipulator arm, a downward pressure is applied by way of the arm to push the assembly 1 to abut against the floor of the slot in the location block 30. The collar 7 remains fixed in position and cannot move downwards. The result is to expose the releasable coupling between the jaw assembly and the end of the manipulator arm. Whilst maintaining the downward pressure the arm is disengaged from the jaw assembly by sliding the carriage towards the location block 31. The carriage movement is also effected by means of the manipulator arm.

The downward pressure applied by the manipulator arm can be removed immediately the end of the arm clears the T-piece 4 on the jaw assembly and during travel of the carriage to the location block 31. Removal of the pressure causes the channel-shaped member 5 at the end of the arm to re-enter the frusto-conical collar 7 under the action of the coil spring 8. If the channel-shaped member is closed at one end, the leading end in moving off the jaw assembly in the location block 30, it is necessary to rotate the end of the arm through 180° in order that the open end of the channel-shaped member 5 is directed towards the T-piece 4 on the jaw assembly in the location block 31. The closing of one end of the member 5 aids accurate alignment between the jaw and arm in a direction parallel to the shafts 25. Alternatively, this additional step can be omitted if the channel-shaped member at the end of the arm is open at both ends.

On approaching the location block 31, downward pressure is again applied to the end of the arm to again expose the channel-shaped member below the conical collar 7. The carriage movement continues until the carriage abuts against the stop or stops 32 on the end wall 23 at which position the channel-shaped member is disposed about the T-piece on the jaw assembly in the block 31. Thereafter, the downward pressure on the arm is released causing the coil spring to revert to its normal position and to draw the inter-engaged T-piece and channel-shaped member within the collar 7. The jaw assembly can then be lifted out of the location block 31 and remains securely attached to the end of the manipulator arm.

The jaw change station is movable within a cell and the ball detents retain the carriage at its end position irrespective of the attitude of the station and during movement between manipulator positions. The carriage is only slidable along the rods 25 when physically pushed by a manipulator arm during change of a jaw assembly.

I claim:

1. Apparatus for changing jaw assemblies on manipulator arms comprising a support frame having a carriage movable between at least first and second positions, location blocks for jaw assemblies, the blocks being mounted on the frame at the first and second positions, the carriage having an opening to permit passage of a jaw assembly therethrough and to receive a displaceable member carried at an end of a manipulator arm, said location blocks and said opening being located such that the opening is alignable with respective location blocks when said carriage is in said first and second positions, said displaceable member enclosing a releasable coupling between the jaw assembly and said end of the arm, the coupling being engagable and disengagable upon movement of the carriage relative to the location blocks and forced movement of the manipulator arm towards the jaw assembly to displace said displaceable member to expose said releasable coupling.

2. Apparatus as claimed in claim 1, in which the releasable coupling comprises a first part connected to the jaw assembly and a second part carried by said end of the arm and relatively movable in the displaceable member so as selectively to be enclosed or not by the displaceable member.

3. Apparatus as claimed in claim 2, in which the first coupling part comprises a T-section element having a stem and the second coupling part comprises a channel member with the stem of the T-section element being slidable in a slot in the channel member.

4. Apparatus as claimed in claim 3, in which the channel member is closed at one end.

5. Apparatus as claimed in claim 1, in which the displaceable member comprises a collar slidable on the end of the manipulator arm.

6. Apparatus as claimed in claim 1, in which each location block has a cruciform groove in a surface facing the carriage.

7. Apparatus as claimed in claim 6, in which the cruciform groove comprises a first groove, and a second groove transverse to and narrower than the first groove.

8. Apparatus as claimed in claim 1, comprising detent means for releasably holding the carriage in the first and second positions.

9. Apparatus as claimed in claim 8, in which the detent means comprises ball detents respectively cooperable with recesses on the carriage, said detents releasable by force exerted by the manipulator arm.

* * * * *